United States Patent
Steely et al.

(10) Patent No.: US 8,924,709 B2
(45) Date of Patent: Dec. 30, 2014

(54) PRINT RELEASE WITH END TO END ENCRYPTION AND PRINT TRACKING

(71) Applicant: Lexmark International, Inc., Lexington, KY (US)

(72) Inventors: Forrest Steely, Lexington, KY (US); Albert Tyler Barnett, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 90 days.

(21) Appl. No.: 13/731,496

(22) Filed: Dec. 31, 2012

(65) Prior Publication Data

US 2014/0189351 A1 Jul. 3, 2014

(51) Int. Cl.
*H04L 9/14* (2006.01)
*H04L 9/08* (2006.01)

(52) U.S. Cl.
CPC .................................. *H04L 9/0861* (2013.01)
USPC ........... 713/153; 713/150; 713/151; 713/152; 713/156; 713/157; 713/160; 726/2; 726/3; 726/5; 726/7; 726/12; 726/14; 726/26; 726/27

(58) Field of Classification Search
CPC ............ H04L 63/0428; H04L 63/0442; H04L 63/0823; H04L 9/0822; H04L 9/0825; H04L 9/14; H04L 9/3263; H04L 9/3265; G06F 3/1222; G06F 3/1238; G06F 3/1285; G06F 3/1288; G06F 21/608; G06F 2211/007; G06F 2221/2107
USPC .......... 713/150–153, 156–157, 160; 726/2, 3, 726/5, 7, 12, 14, 26, 27
See application file for complete search history.

(56) References Cited

U.S. PATENT DOCUMENTS 7,003,667 B1 * 2/2006 Slick et al. ..................... 713/182
2009/0063860 A1 * 3/2009 Barnett et al. ................ 713/171

* cited by examiner

*Primary Examiner* — Joseph P. Hirl
*Assistant Examiner* — Kalish Bell (57) ABSTRACT

A method for encrypting print jobs that includes receiving output data, encrypting the output data with a randomly-generated symmetric session key, generating a session key header by encrypting the randomly-generated symmetric session key using an asymmetric user public key, and encrypting the session key header using a server public key.

11 Claims, 6 Drawing Sheets

PRINT RELEASE WITH END TO END ENCRYPTION AND PRINT TRACKING

CROSS REFERENCE TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure relates to encryption, and, more particularly, to end to end print job encryption and print tracking.

2. Description of the Related Art

It is advantageous for any type of printing environment to keep print jobs secure, with no information contained in the print data stream exposed to any party other than the originator of the print job.

Some networked printer systems utilize encryption to prevent the unauthorized viewing of the contents of print jobs. Network printers are typically connected to a client device either directly or via a print server. Where a printer is connected over the network directly to a client device, prior art systems permit encryption of print data sent from the client to the printer. Prior art print job encryption systems make use of a public key from a destination printer and therefore require the destination printer to be selected prior to the start of the encryption process. This requires that once encrypted, the print job can only be decrypted and printed at the previously selected printer. Where a printer is connected over the network via a print server, prior art print job encryption systems allow the print job to be encrypted while in transit from the client device to the server and from the server to the printer, but yet unencrypted while on the print server.

Accordingly, there is a need for a solution that prevents data exposure by keeping the print job completely encrypted during transit from an original client workstation to the print server, while on the print server, and from the print server to the printer. There is also a need for a solution that eliminates, or at least reduces, exposure to print server intrusions by keeping the print data encrypted while at rest on the print server. There is also a need for a solution that allows the destination printer to be chosen after the print job is already at the print server, while still maintaining the security of the print data.

SUMMARY

According to one example embodiment of the present disclosure, there is provided a method of preparing a print job for secure transmission that includes generating the print data, encrypting the print data with a randomly-generated symmetric session key, generating a session key header by encrypting the randomly-generated symmetric session key with the user's public asymmetric key, and encrypting the session key header using the print server's public asymmetric key.

In one aspect, the print server's public asymmetric key is obtained from the print server. In another aspect, the session key header is again encrypted, this time using the print server's asymmetric public key. In another aspect, a print job is generated by appending the encrypted session key header and the encrypted print data and then sent to the print server.

In yet another aspect of the first example embodiment, the print server may decrypt the session key header using the print server's private asymmetric key. In another aspect, the print job remains on the print server until the user selects a destination printer. In another aspect, the print server may obtain the destination printer's public asymmetric key from the destination printer. In another aspect of the first example embodiment, the server may encrypt the session key header using the destination printer's public asymmetric key and then send the print job to the destination printer. In another aspect, the destination printer may decrypt the session key header using the printer's private asymmetric key. In another aspect, the user may present to the destination printer his user credentials with his private asymmetric key which is used to again decrypt the session key header, yielding the session key unencrypted. In another aspect, the session key may be used to decrypt the print data. In another aspect, the decrypted print data is printed.

According to a second example embodiment of the present disclosure, there is provided a method of preparing a print job for secure transmission that includes generating the print data, gathering metadata associated with the print data, encrypting the print data with a randomly-generated symmetric session key, generating a session key header by encrypting the randomly-generated symmetric session key using the user's public asymmetric key, generating a print metadata file that includes the print data metadata along with the encrypted session key header, and encrypting the print metadata file using the print server's public asymmetric key.

In one aspect of the second example embodiment, the print data is generated and various metadata associated with the print data is gathered. This metadata may include, but is not limited to, an originating user ID, Print Job name and/or number, time of job origination, originating computer name, originating computer IP address and/or DNS name, originating computer serial number, originating computer model, originating computer operating system and level, queue name, port name, originating application name, total bytes to be printed, and/or one or more finishing options. Finishing options may include, but are not limited to, the number of copies requested, total number of pages printed, whether N-up is requested, whether duplex is requested, whether the print job is to be printed in color or mono, paper type, paper size, and whether collation is requested. In another aspect, the print data is encrypted using a randomly-generated symmetric session key. In another aspect, a session key header is generated by encrypting the randomly-generated symmetric session key using the user's public asymmetric key. In another aspect, the print server's public asymmetric key is obtained from the print server. In still another aspect, a print job is generated by appending the encrypted print metadata file and the encrypted print data.

In yet another aspect of the second example embodiment, the print server may decrypt the print metadata file using the print server's private asymmetric key, yielding the metadata in an unencrypted state and the session key header still encrypted with the user private key. In another aspect, the unencrypted metadata may be used to populate the print tracking database with information about the print job. In another aspect, the print job may remain on the print server until the user selects a destination printer. In another aspect, the print server may obtain the destination printer's public asymmetric key from the destination printer. In another aspect of the second example embodiment, the print server may encrypt the print metadata file using the destination printer's public asymmetric key and send the print job to the destination printer. In another aspect, the destination printer may decrypt the print metadata file using the printer's private asymmetric key. In another aspect, the user may present his user credentials to the destination printer with his private asymmetric key, which is used to again decrypt the session key header and yield the session key unencrypted. In another aspect, the session key is used to decrypt the print data. In another aspect, the decrypted print data is printed. In another aspect of the second example embodiment, the decrypted metadata may be used to verify the validity of the unencrypted print data. In yet another aspect of one example embodiment, a user credential token may be a smart card containing the user's private asymmetric key.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

The following description and drawings illustrate embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced items.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are a system and methods of releasing print jobs with end-to-end encryption and secure print tracking using metadata of a print data stream. One example method of securing print data prior to transmission from a client device to a print server includes generating print data, encrypting the print data with a randomly-generated symmetric session key, generating a session key header by encrypting the randomly-generated symmetric session key using an asymmetric user public key, generating a print metadata file comprising the print data metadata and the encrypted session key header, and encrypting the print metadata file using a server public key.

One example method of receiving the print job at the print server, gathering print tracking information, and holding for release at the destination output device includes receiving an encrypted metadata, an encrypted session key header and an encrypted print data, decrypting the metadata using the print server private key, then re-encrypting it with the output device public asymmetric key.

One example method of printing a secure print job in output device includes receiving an encrypted metadata, an encrypted session key header and an encrypted print data; generating a decrypted session key header by decrypting the encrypted metadata and the encrypted session key header using an output device public key; generating an unencrypted session key header by transmitting the decrypted session key header to a user credential token for decrypting using an asymmetric user private key; decrypting the encrypted print data using the unencrypted session key; and printing the unencrypted print data.

For purposes of the present disclosure, it will be appreciated that the terms print data, print data stream and print job, as will be described below, may refer to documents, photos or any other file that may be used to generate or produce a printed output on a media or a visual output on a display, such as, for example, a computer monitor that may be part of a client device. The process for printing the one or more print data and/or print jobs may require that the one or more of these files be processed and/or reassembled into a format that resembles that which is displayed on an interface when the one or more files are accessed. If the one or more files displayed on or retrieved by the imaging or output device are not in a format that the output device recognizes or is capable of printing, a transform or conversion process may be performed on the one or more images in order to convert the one or more images into a format recognizable by the output device, i.e., a printable format. Printable formats may include, but are not limited to, PCL, PostScript, JPEG and PDF formats.

Figure 1:
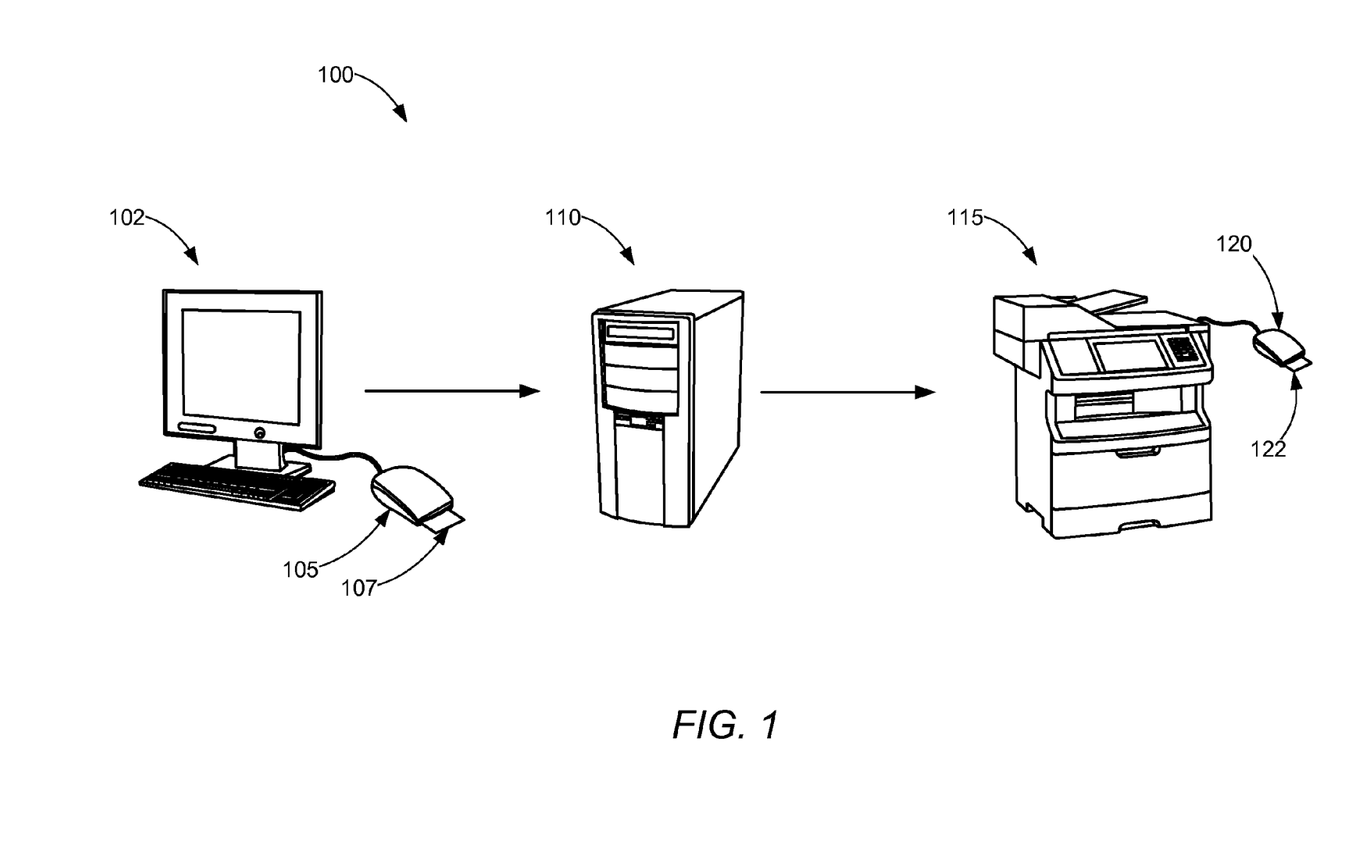
FIG. 1 is a block diagram of one example document processing system.

Referring to FIG. 1, there is shown a block diagram of one example document processing system 100. Document processing system 100 may include a client device 102, a client device user credential reader 105 for reading a user credential token 107, a print server 110, an output device 115 and an output device user credential reader 120 for reading a user credential token 122. Client device 102 may include the client device user credential reader 105 and an output device driver (not shown) that may have a client device cryptographic module (not shown). Print server 110 may include a print server cryptographic module (not shown). Output device 115 may include the output device credential reader 120, a controller (not shown), a print engine (not shown) and an output device cryptographic module (not shown).

Client device 102 may be a personal computer, as shown in FIG. 1. In other alternative embodiments, client device 102 may be any device capable of sending print data to output device 115 via print server 110, such as, a mobile phone, smart phone, tablet or personal digital assistant. It will be appreciated that yet other devices capable of sending documents or images to output device 115 may also be used as client device 102.

Client device 102 may include a display device, an input device (e.g., keyboard), a processor, input/output (I/O) interfaces, memory, such as RAM, ROM and/or NVRAM. Client device 102 may also include a mass data storage device, such as a hard drive, CD-ROM and/or DVD units. During operation, client device 102 may include in its memory a software program including program instructions that function as an output device driver for output device 115. The output device driver may communicate with print server 110 via a communications link. In addition, the output device driver may provide formatted print data ready for printing by output device 115.

Client device 102 may include a client device cryptographic module (not shown). The client device cryptographic module may be encryption software installed as part of the output device driver of client device 102. In an alternative example embodiment, the client device cryptographic module may be a separate application installed in client device 102 that works in conjunction with the output device driver. The client device cryptographic module may generate random symmetric keys, obtain user credentials from client device user credential token 107, and obtain data from files such as, for example, print jobs. The client device cryptographic module may also perform cryptographic operations such as encryption and decryption. The client device cryptographic module may utilize a variety of encryption algorithms known in the art, including, but not limited to, an RSA encryption algorithm (e.g., 1024-bit, 2048-bit, etc.) that may utilize asymmetrical keys (e.g., public and private keys) as well as symmetrical keys.

Client device user credential reader 105 may be a device that reads and interprets data contained on client device user credential token 107, which may include authentication details and user credentials such as, for example, a username, password, unique identification code and an asymmetric key-pair such as an asymmetric user private key and an asymmetric user public key. Client device user credential token 107 may be a common access card (CAC), identification card, secure card, or any smart card containing user information that may provide security authentication details for the user. For example, the user may provide user credentials to client device 102 by sending, to client device 102, a signal containing authentication information included in client device user credential token 107.

In other alternative example embodiments, client device 102 may request user credentials prior to granting access to output device 115. For example, an input device of client device 102 may prompt the user to enter authentication information, such as a username and/or password or some other security identification. In yet other alternative example embodiments, other security tokens, such as an X.509 certificate, may be used.

A communications link, such as a cell phone data link, a Wi-Fi link, or any other form of wired or wireless communication link, may allow client device 102 to communicate with print server 110 via a network. Print server 110 may receive one or more files from client device 102 via the communications link. Client device 102 may upload or send the one or more files to print server 110 for rendering into a printable format for printing and/or for storing in print server 110 or in a storage location remote from both client device 102 and print server 110. Print server 110 may have an appropriate software application program that is capable of directing the translation of the one or more files into a format recognized by output device 115. Once the files or data have been translated into an appropriate or recognizable format for printing, it may be referred to as a print job.

Print server 110 may transfer the one or more files to a remote storage location, such as, for example, a database server, where the one or more files may be obtained by output device 115 for printing. It will be appreciated by one of ordinary skill in the art that in some example embodiments, client device 102 may also render the one or more files into a printable format before uploading the one or more files to print server 110.

Print server 110 may be capable of buffering multiple print jobs sent by client device 102. Print server 110 may queue print jobs that are ready for printing by output device 115 until output device 115 is ready to receive the print jobs or, alternatively, until output device 115 retrieves the print jobs from print server 110.

Print server 110 may be part of a group of geographically dispersed servers that may be registered to a domain. The domain may be used to access the group of servers, among which is print server 110 that may be used to release print jobs to be printed by output device 115. In an alternative example embodiment, print server 110 may include one or more server devices or systems of computerized devices. In another alternative example embodiment, print server 110 may either be partially or wholly installed on the client device 102 and/or the output device 115.

Print server 110 may include a print server cryptographic module (not shown). The print server cryptographic module may be encryption software installed in print server 110. The print server cryptographic module may generate random symmetric keys, obtain user credentials, obtain public keys from other devices, and obtain data from files such as, for example, print jobs. The print server cryptographic module may also perform cryptographic operations such as encryption and decryption. The print server cryptographic module may utilize a variety of encryption algorithms known in the art, including, but not limited to, an RSA encryption algorithm (e.g., 1024-bit, 2048-bit, etc.) that may utilize asymmetrical keys (e.g., public and private keys) as well as symmetrical keys.

Output device 115 may be any device capable of imaging, printing or producing a hard copy of a data file or document stored in electronic form. Example output devices include, but are not limited to, laser, inkjet or dot matrix printers or multi-function printing devices that have the capability of performing other functions, such a faxing, e-mailing, scanning and/or copying, in addition to printing.

Output device user credential reader 120 may be a device that allows a user of output device 115 to provide authentication details and user credentials such as, for example, a username, password, unique identification code or an asymmetric key-pair such as an asymmetric user private key and an asymmetric user public key. Output device user credential token may be a common access card (CAC), identification card, secure card, or any smart card containing user information that may provide security authentication for the user. For example, the user may provide user credentials to output device 115 by sending, to output device 115, a signal containing authentication information included in a secure card.

In other alternative example embodiments, providing user credentials may include prompting the user for a username and/or password or some other security identification for access to output device 115. For example, the user may be prompted to enter authentication information which may include a username and a password. In other alternative embodiments, other security tokens may be used such as an X.509 certificate.

Output device 115 may include an output device cryptographic module (not shown). The output device cryptographic module may be encryption software installed in output device 115. The output device cryptographic module may generate random symmetric keys, obtain user credentials, obtain keys from other devices, and obtain data from files such as, for example, print jobs. The output device cryptographic module may also perform cryptographic operations such as encryption and decryption. The output device cryptographic module may utilize a variety of encryption algorithms known in the art, including, but not limited to, an RSA encryption algorithm (e.g., 1024-bit, 2048-bit, etc.) that may utilize asymmetrical keys (e.g., public and private keys) as well as symmetrical keys.

Client device 102, print server 110 and output device 115 may be interconnected on a network such as, for example, a TCP/IP network. As used herein, the network may refer to one or more connections between devices such as, for example, client device 102, print server 110 and output device 115. It will be appreciated that the network may include multiple interconnections between a plurality of client devices, print servers and output devices. The network may be any Internet Protocol (IP) based computer network capable of communicating data and other information between client device 102, output device 115 and print server 110. The network may comprise a Local Area Network (LAN) or a wide area network (WAN) (e.g., Internet), and may be a public or private network. Network 110 may use any communication medium, such as cable, optical fiber, radio carriers, etc., or any combination thereof, to communicate with client device 102, output device 115 and print server 110.

Each of client device 102, print server 110 and output device 115 may have its own data storage medium (not shown) which may be used to store data such as, for example, print data, job metadata, session keys, asymmetric public keys and symmetric public keys. The data storage medium of print server 110 may be used to hold print jobs prior to sending to a destination output device 115 for printing.

As used herein, the terms "component" and "module" (such as "cryptographic module") may refer to hardware, software or any combination thereof. Other hardware and software may be used, including, but not limited to, different client devices, print servers, output devices (such as, but not limited to, display devices, audio devices, and any type of printer, including dot matrix, inkjet, laser, thermal, and LED), networks, and encryption algorithms (such as, but not limited to, DES, 3DES, AES (Rijndael), RSA, Serpent, Twofish, RC6 and MARS), and encryption devices. Other encryption schemes may be utilized, such as, but not limited to, purely asymmetric key exchange for all transactions or the transmission of symmetric keys. It is to be understood that the cryptographic keys discussed herein may be included in cryptographic certificates. For example, the output device public key may be included in the output device public certificate which may be transmitted to client device 102 via print server 110.

Figure 2:
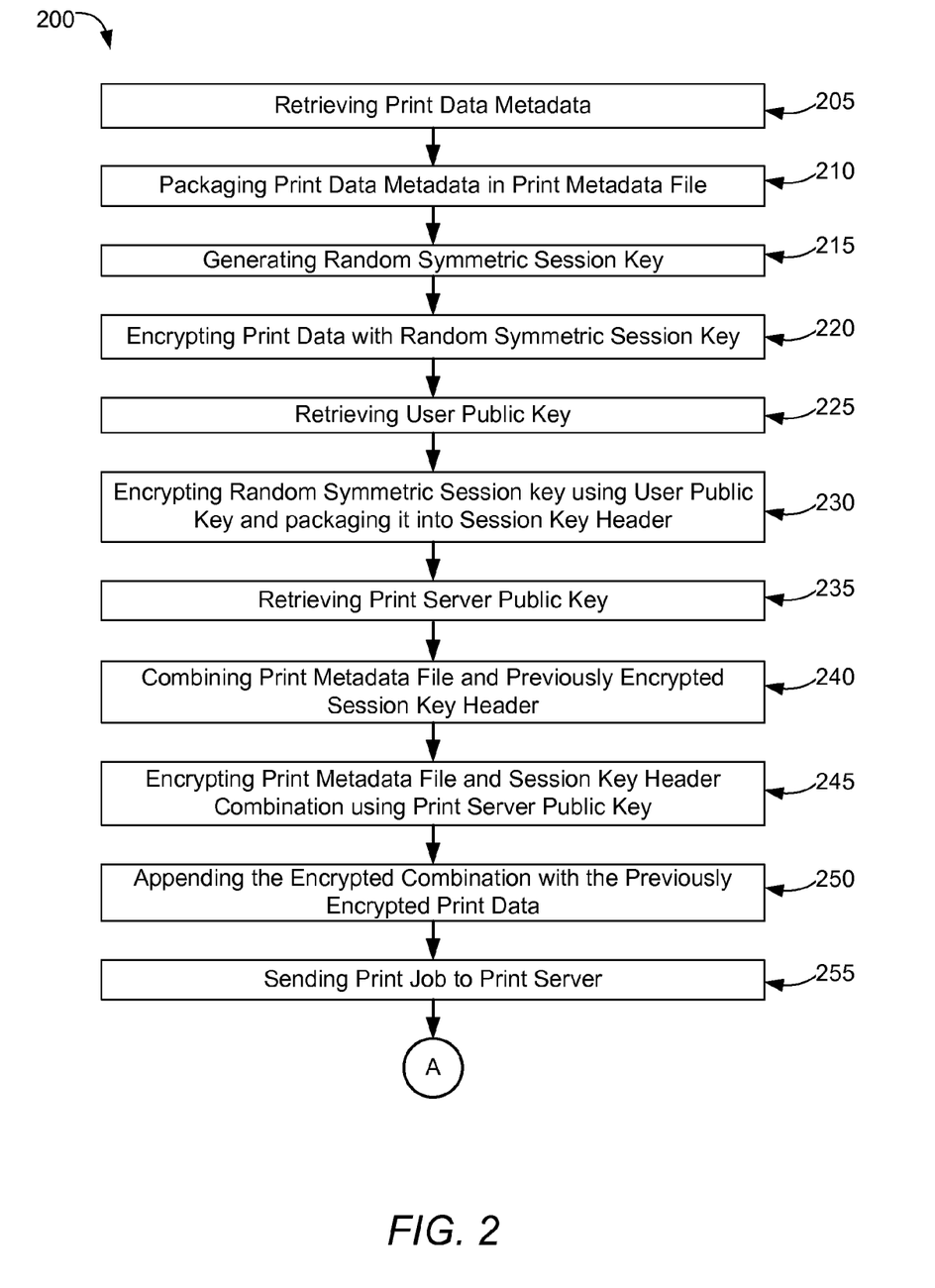
FIG. 2 is a flowchart of one example method of encrypting print data prior to sending it to a print server.

Referring to FIG. 2, there is shown a flowchart of one example method 200 of encrypting print data prior to sending to print server 110. Method 200 may performed by the client device cryptographic module in conjunction with the output device driver in client device 102 in an illustrative embodiment of the present disclosure. In an alternative embodiment, some of the steps in method 200 may be performed by the output device driver in client device 102 while other steps may be performed by the client device cryptographic module. Method 200 may process print data metadata, print data and a random symmetric session key for secure transmission to print server 110.

At block 205, output device driver may obtain print data metadata associated with a print data stream generated by an application in client device 102 for printing by output device 115. Print data metadata may include information regarding the print data such as, for example, an original user ID, print data name and/or number, time of job origination, originating computer name, originating computer IP address and/or DNS name, originating computer serial number, originating computer model, originating computer operating system and level, queue name, port name, originating application name, total bytes to be printed, and/or one or more finishing options. Finishing options may include, but are not limited to, number of copies requested, total number of pages printed, whether N-up is requested, whether duplex is requested, whether the print job is to be printed in color or mono, paper type, paper size, and whether collation is requested. Obtaining job metadata may be performed after output device driver receives the print data for processing by output device driver for subsequent printing by output device 115.

At block 210, print data metadata may be packaged as XML data contained within a job information block or print metadata file. It will be appreciated by one of ordinary skill in the art that other data formats may be used to package the print data metadata.

At block 215, the client device cryptographic module may generate a random symmetric session key. The random symmetric session key may be a randomly generated secret symmetric key that is used to encrypt the print data by a selected algorithm (at block 220). The random symmetric session key may be a random value that is used as a secret key to encrypt the print data. The client device cryptographic module may encrypt the print data using an encryption algorithm such as, for example, a symmetric encoding algorithm. One such known symmetric encoding algorithm is AES or the Advanced Encryption Standard, which is also known by those skilled in the art as the Rijndael algorithm. In alternative example embodiments, other symmetric algorithms may be used to encrypt the print data using the randomly-generated symmetric session key.

At block 225, a user public key may be retrieved. The user public key may be a user credential such as, for example, an X.509 certificate, which may be obtained by the client device cryptographic module from client device user credential token 107 such as, for example, a Common Access Card (CAC). For example, the user of client device 102 may use an application in client device 102 to generate print data, and client device 102 may request the user to provide user authentication details through the use of the CAC. With the CAC, the user may then provide a user public key, which may be retrieved by the client device cryptographic module. The user public key may be used as an asymmetric public key. In an alternative example embodiment, other security tokens that provide user credentials may be used.

At block 230, the randomly-generated symmetric session key may be encrypted using the retrieved user public key and may be packaged into a session key header. The randomly-generated symmetric session key may be encrypted using an asymmetric algorithm such as, for example, an RSA algorithm.

At block 235, the client device cryptographic module may query print server 110 for a public key of print server 110. The print server's public key may be obtained using a print server credential such as, for example, an X.509 certificate of print server 110. In other example embodiments, other print server credentials may be used to obtain the print server's public key.

At block 240, the client device cryptographic module may generate the print metadata file and combine it with the session key header (which was previously encrypted with the user public key). The client device cryptographic module may also encrypt the combination (i.e., the print metadata file and the session key header) using the asymmetric print server public key (at block 245). The combination may be encrypted using an asymmetric algorithm such as, for example, an RSA algorithm.

Figure 6:
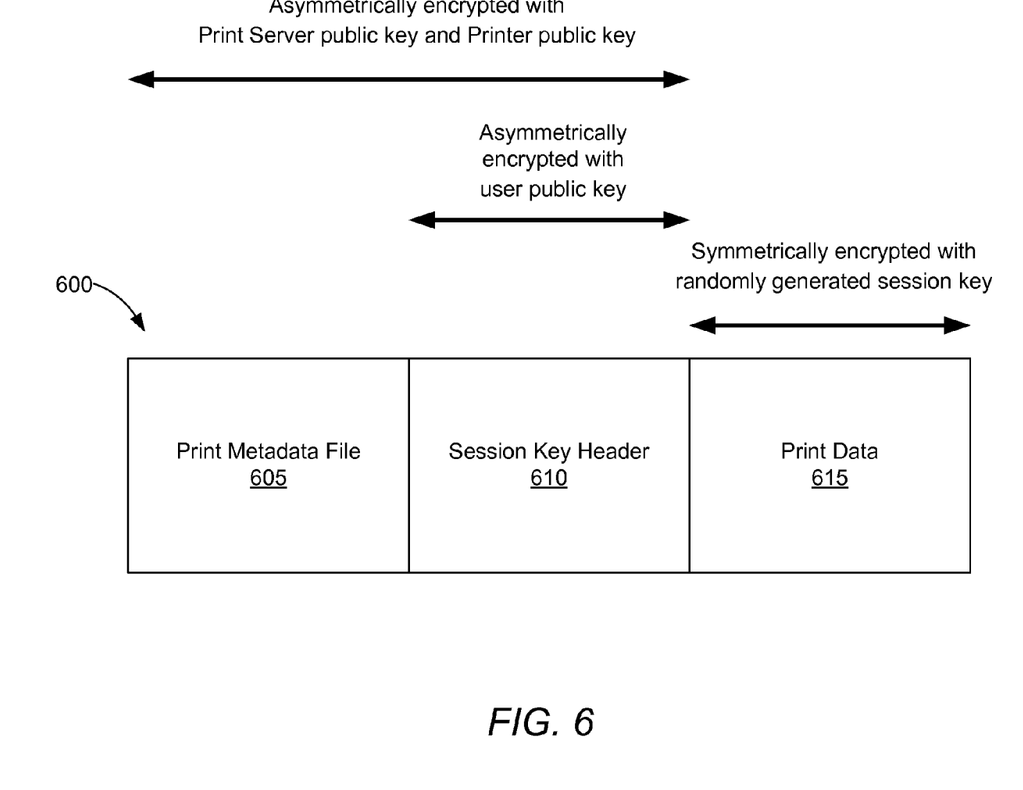
FIG. 6 is a block diagram of one example print job.

At block 250, the encrypted print metadata file may be appended with the previously encrypted print data to form a print job 600, as shown in FIG. 6.

FIG. 6 shows one example embodiment of a print job 600, wherein print metadata file 605 and session key header 610 are appended to print data 615. At this point in method 200, session key header 610 may be encrypted twice—the first encryption using the user credential or the symmetric user public key, and the second encryption using the asymmetric print server public key along with the print metadata file 605.

With continued reference to FIG. 2, print job 600 is sent to print server 110 at block 255 using the one or more communication links.

Figure 3:
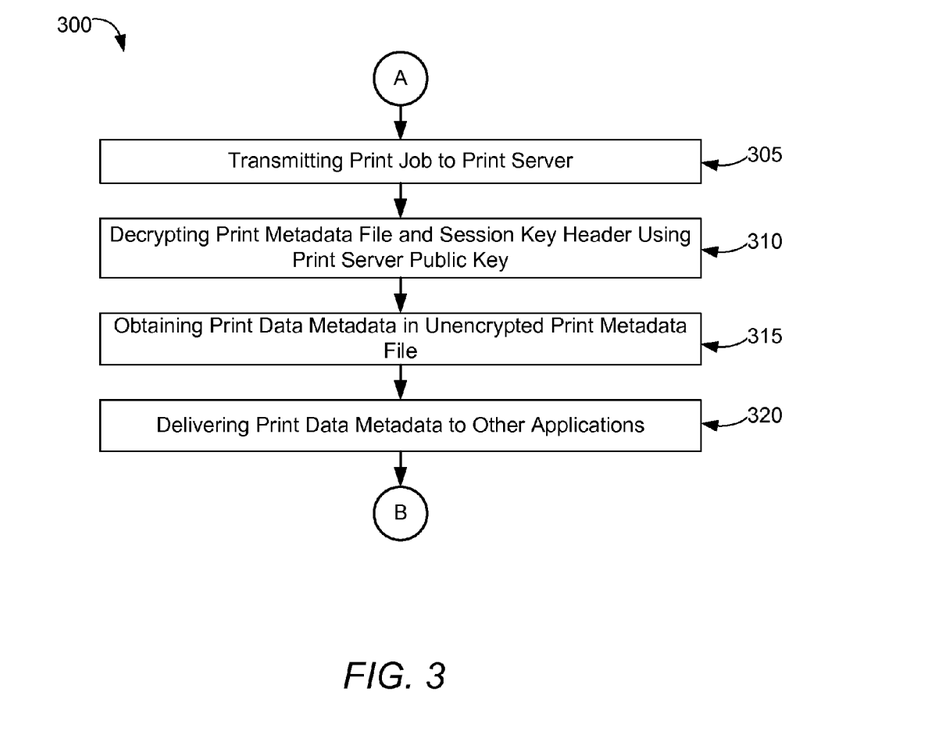
FIG. 3 is a flowchart of one example method for processing secure print data received in a print server.

Referring to FIG. 3, there is shown a flowchart of one example method 300 for processing secure print data received in print server 110. Method 300 may be performed by the print server cryptographic module in print server 110 in an illustrative embodiment of the present disclosure. In an alternative example embodiment, method 300 may be performed by another application installed in print server 110 or in another device operating in conjunction with print server 110. Method 300 may perform in conjunction with or as a continuation of method 200 after the output device driver in client device 102 sends print job 600 to print server 110 (at block 255).

At block 305, print job 600 is transmitted from client device 102 to print server 110. Print job 600 is received by print server 110. Since print metadata file 605 and session key header 610 were encrypted using the print server's asymmetric public key (at block 245 in method 200), print server cryptographic module may decrypt print metadata file 605 and session key header 610 using the print server's asymmetric private key at block 310.

Since print metadata file 605 is encrypted once with the print server's asymmetric public key, the print server cryptographic module may obtain unencrypted print data metadata contained in the now-decrypted print metadata file 605 (at block 315). The unencrypted print data metadata may contain information about the print job, which the print server cryptographic module may deliver to any job tracking software that may be associated with or connected to print server 110 (at block 320). At block 320, print server 110 may have no access to the session key header 610, which may be partly-decrypted using the asymmetric print server public key but still remains encrypted using the user credential, or the print data 615, which is still encrypted using the randomly-generated session key packaged in the encrypted session key header 610.

Print job 600 may be held on print server 110 until a user of output device 115 requests transmission of print job 600 to output device 115 for printing. Output device 115, used to request the transmission of print job 600, may be referred to as a destination output device of print job 600 and may be used to produce output corresponding to print data or to print job 600. As aforementioned, session key header 610 and print data 615 remain encrypted while held at print server 110 while print metadata file 605 may be unencrypted while held at print server 110.

Figure 4:
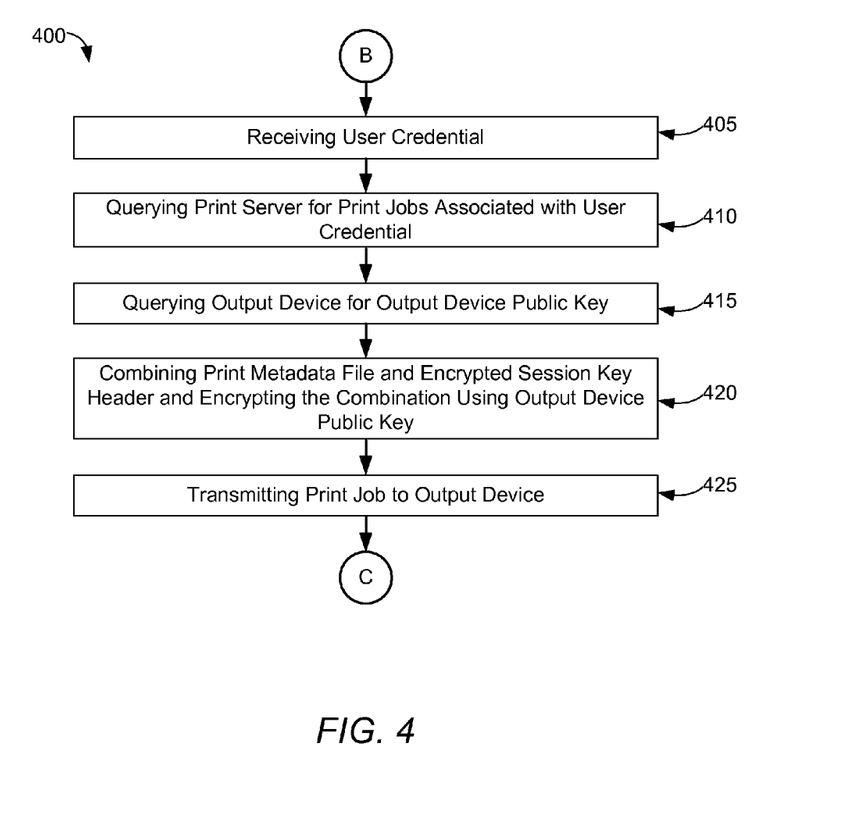
FIG. 4 is a flowchart of one example method of securely transmitting an encrypted print job to an output device for printing.

Referring to FIG. 4, there is shown a flowchart of one example method 400 of securely transmitting an encrypted print job to output device 115 for printing. Method 400 may be used in conjunction with method 300 in FIG. 3 and may be performed by the print server cryptographic module in print server 110 and the output device cryptographic module in output device 115.

At block 405, user credentials may be received by output device 115. For example, a user may approach output device 115 and provide authentication details using output device credential token 122, such as a common access card (CAC), to output device credential reader 120. The authentication details may include user credentials that may be used by output device 115 to query print server 110 for at least one print job associated with the user credentials (at block 410).

Print server 110 may then provide print job 600 to output device 115 if print job 600 is determined to be associated with the authentication details received. In one example embodiment, print server 110 may automatically send print job 600 to output device 115 upon request by user of output device 115. In an alternative example embodiment, the user of output device 115 may be presented with options for print jobs to be selected for printing, the options being based upon the authentication details received. It will be appreciated by one of ordinary skill in the art that many possible implementation scenarios exist for providing or transmitting print job 600 from print server 110 to output device 115.

At block 415, the print server cryptographic module may query output device 115 for the output device public key. The output device public key may be an asymmetric public key from the output device credentials such as, for example, an X.509 certificate of the output device 115.

The print server cryptographic module may query output device 115 in order to encrypt the combination of print metadata file 605 and session key header 610 using the output device public key prior to transmitting print job 600 to output device 115 for printing (at block 420). Encrypting the combination of print metadata file 605 and session key header 610 may be performed using an asymmetric algorithm such as, for example, an RSA algorithm. In alternative example embodiments, other types of algorithms may be used to encrypt the combination of print metadata file 605 and session key header 610.

The encrypted combination may then be appended to print data 615 to form a newly-encrypted print job 600 prior to transmitting print job 600 to output device 115 for printing (at block 425).

Figure 5:
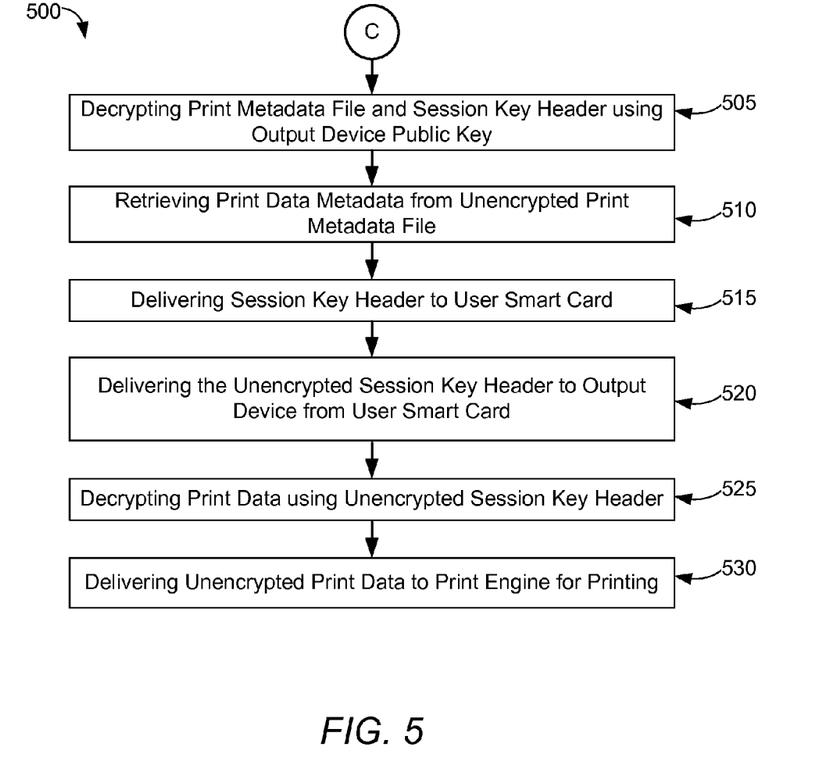
FIG. 5 is a flowchart of one example method of processing a secure print job in an output device for printing.

Referring to FIG. 5, there is shown a flowchart of one example method 500 of processing a secure print job in output device 115 for printing. Method 500 may be used in conjunction with method 400 in FIG. 4 and performed by the output device cryptographic module of output device 115.

Since print metadata file 605 and session key header 610 were encrypted using the output device public key, the output device cryptographic module at block 505 of method 500 may decrypt the print metadata file 605 and session key header 610 using the output device private key. Output device 115 may then retrieve the print job metadata included in the formatted print metadata file (at block 510).

The decrypted print job metadata may be used by output device 115 for verification of unencrypted print data 615 such as, for example, checking the number of pages printed against the expected number of pages to be printed. Output device 115 may also generate exception alerts using the decrypted print job metadata for errors or discrepancies in printing. For example, output device 115 may generate alerts if print data 615 is expected to be printed using duplex but output device 115, chosen as the destination output device, does not include a duplexor, and the print job ends up being printed in simplex instead.

Before the print job metadata may be used by output device 115 for the verification of print data 615, print data 615 may be decrypted in order for output device 115 to access the contents of print data 615 and produce an output of print data 615. At block 515, session key header 610 may be delivered to client device user credential token 122 for decrypting the output device user credential token 122 using the symmetric user private key, which may only be contained in a credential token of user such as, for example, a smart card or a common access card (CAC).

After the decryption of session key header 610, output device user credential token 122 delivers the unencrypted session key header 610 to output device cryptographic module (at block 520) and uses the session key retrieved from the unencrypted session key header 610 to decrypt print data 615 (at block 525). At block 530, the unencrypted print data 615 may then be delivered to the print engine of output device 115 for printing.

Because print data 615 is encrypted prior to transmission from client device 102, print data 615 may not be available in decrypted form to anyone who may intercept print job 600 anywhere between client device 102 and output device 115. In particular, print data 615 may not be available in decrypted form on print server 110 or on storage medium of print server 110. Thus, the contents of the print job 600 may be protected from viewing by anyone who may attempt to intercept the data during transmission, and the contents of print job 600, including the metadata in print metadata file 605, are also protected from viewing by anyone with access to the data storage medium on print server 115, such as the server administrator.

It will be appreciated that the actions described and shown in the example methods described in the flowcharts may be carried out or performed in any suitable order. It will also be appreciated that not all of the actions described in FIGS. 2, 3, 4 and 5 need to be performed in accordance with the example embodiments of the disclosure and/or additional actions may be performed in accordance with other example embodiments of the disclosure.

Many modifications and other embodiments of the disclosure set forth herein will come to mind to one skilled in the art to which this disclosure pertains having the benefit of the teachings presented in the foregoing description and the associated drawings. Therefore, it is to be understood that the disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A system for securely transmitting an output data having metadata to an output device, comprising:
 a client device; and
 a server having a server public key, the server operatively interposed between the client device and the output device on a network;
 wherein the client device generates a random symmetric session key and encrypts the output data using the random symmetric session key, the client device encrypts the random symmetric session key using an asymmetric user public key, the client device encrypts the encrypted random symmetric session key and the metadata using the server public key, and the client device sends the encrypted output data, the first double-encrypted random symmetric session key and the encrypted metadata to the server.

2. The system of claim 1, wherein the client device generates an output job by combining the encrypted metadata, the first double-encrypted random symmetric session key and the encrypted output data.

3. The system of claim 1, wherein the server decrypts the metadata using a server private key.

4. The system of claim 3, wherein the server sends the decrypted metadata to a job tracking software.

5. The system of claim 1, wherein the server encrypts the metadata using an output device public key prior to transmitting the metadata to the output device.

6. The system of claim 1, wherein the server generates a second double-encrypted random session key by encrypting the encrypted random symmetric session key using an output device public key prior to transmitting the second double-encrypted random symmetric session key to the output device.

7. The system of claim 6, wherein the output device generates the encrypted random symmetric session key by decrypting the second double-encrypted random symmetric session key using an output device private key.

8. The system of claim 7, wherein the output device decrypts the encrypted random symmetric session key using the asymmetric user private key.

9. The system of claim 8, wherein a third cryptographic module uses the decrypted random symmetric session key to decrypt the encrypted output data.

10. A method, comprising:
   receiving, by a client device, an output data;
   encrypting, by a client device, the output data with a randomly-generated symmetric session key;
   generating, by a client device, a session key header by encrypting the randomly-generated symmetric session key using an asymmetric user public key; and
   encrypting, by a client device, using a server public key, the session key header and a metadata associated with the output data, wherein a server decrypts the encrypted session key header and the encrypted metadata using the server private key and wherein the server encrypts the session key header using an output device public key.

11. The method of claim 10, further comprising generating, by the client device, an output job by appending the encrypted session key header and the encrypted metadata to the output data.

* * * * *